March 3, 1936. S. QUATTRIN ET AL 2,032,812
APPARATUS FOR MAKING CONFECTIONS
Filed March 12, 1932 4 Sheets-Sheet 2
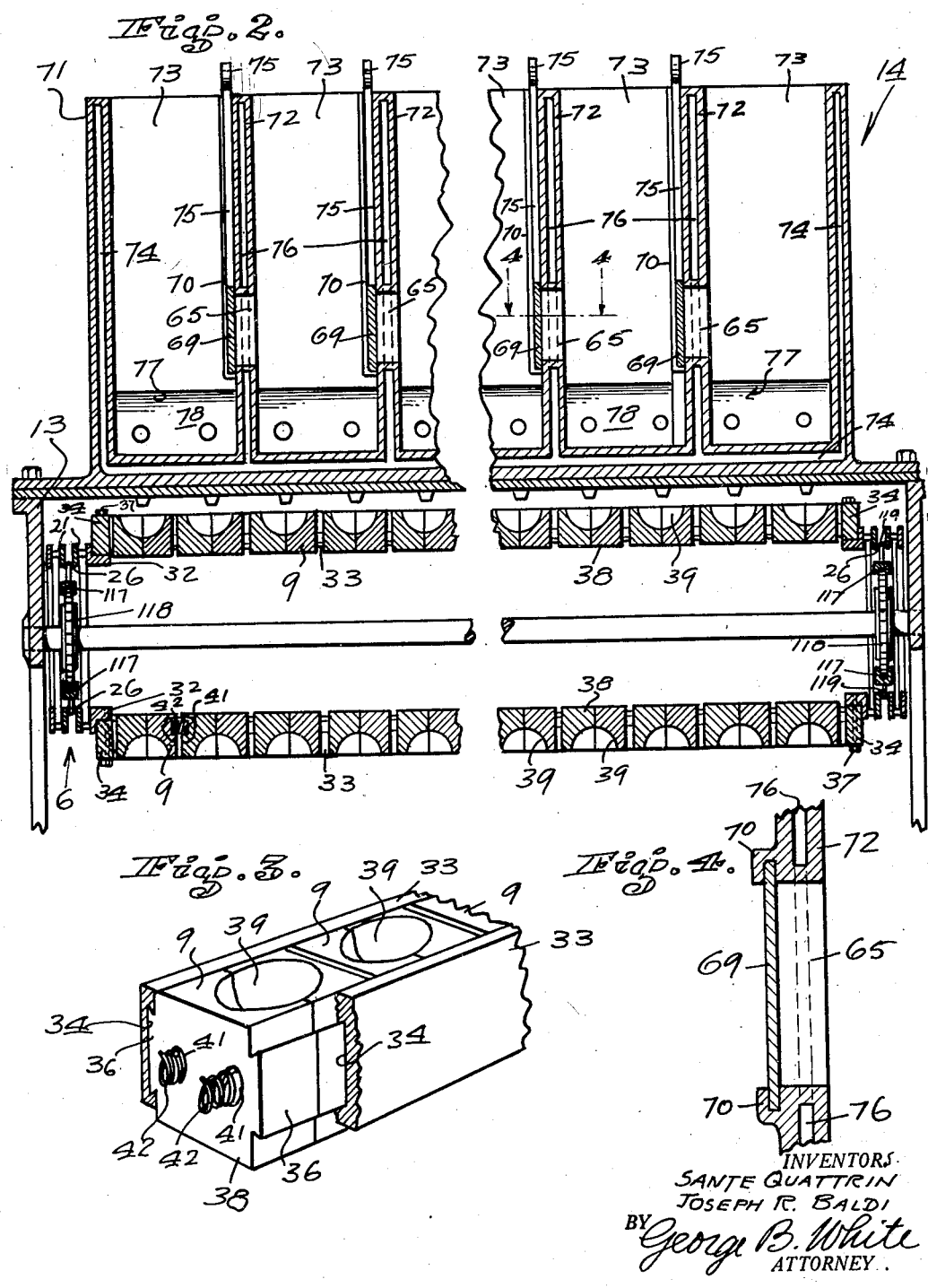
INVENTORS
SANTE QUATTRIN
JOSEPH R. BALDI
BY George B. White
ATTORNEY March 3, 1936. S. QUATTRIN ET AL 2,032,812
APPARATUS FOR MAKING CONFECTIONS
Filed March 12, 1932 4 Sheets-Sheet 3
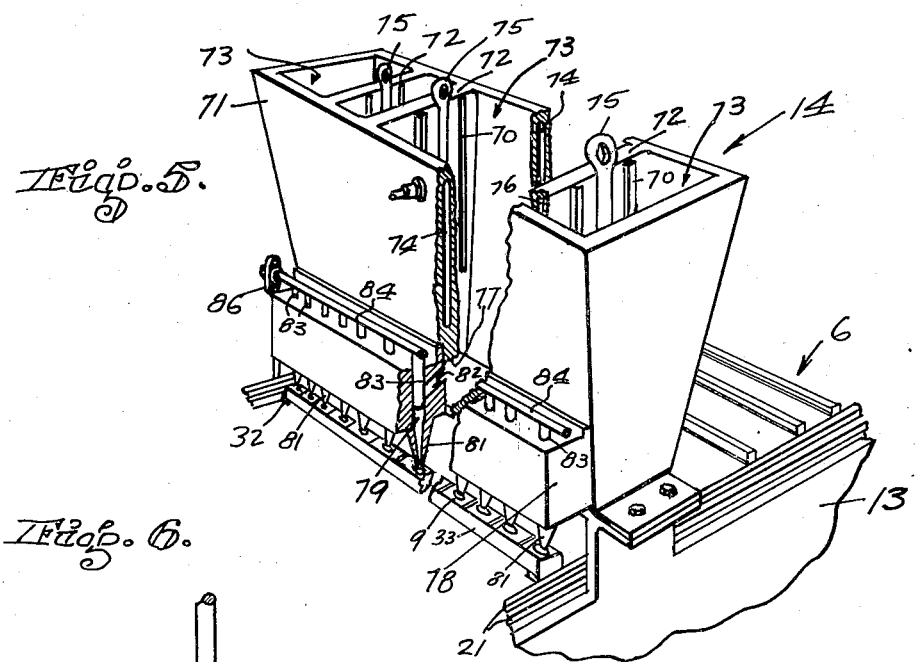
Fig. 5.
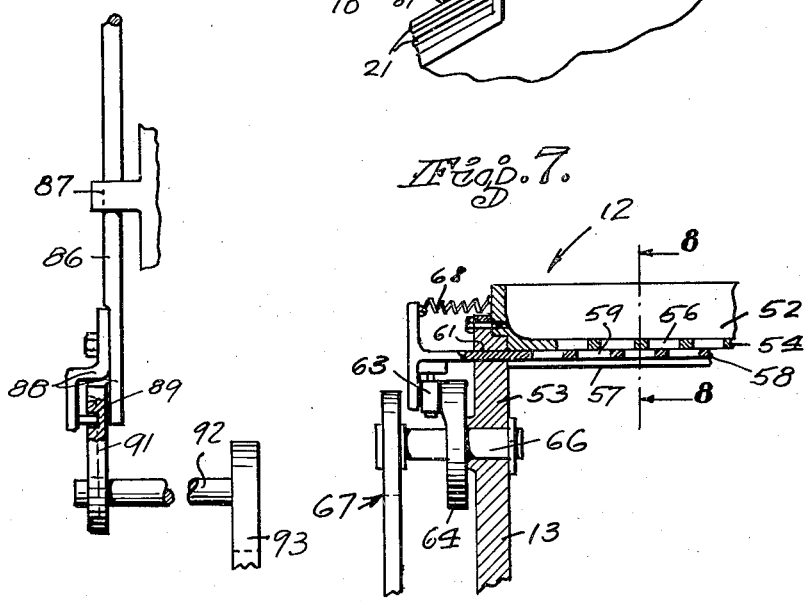
Fig. 6.
Fig. 7.
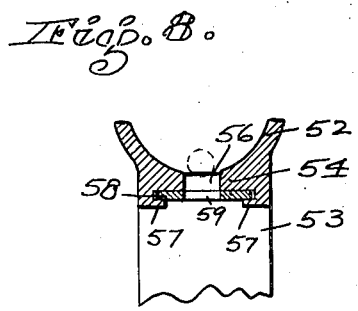
Fig. 8.
INVENTORS
SANTE QUATTRIN
JOSEPH R. BALDI
BY George B. White
ATTORNEY.

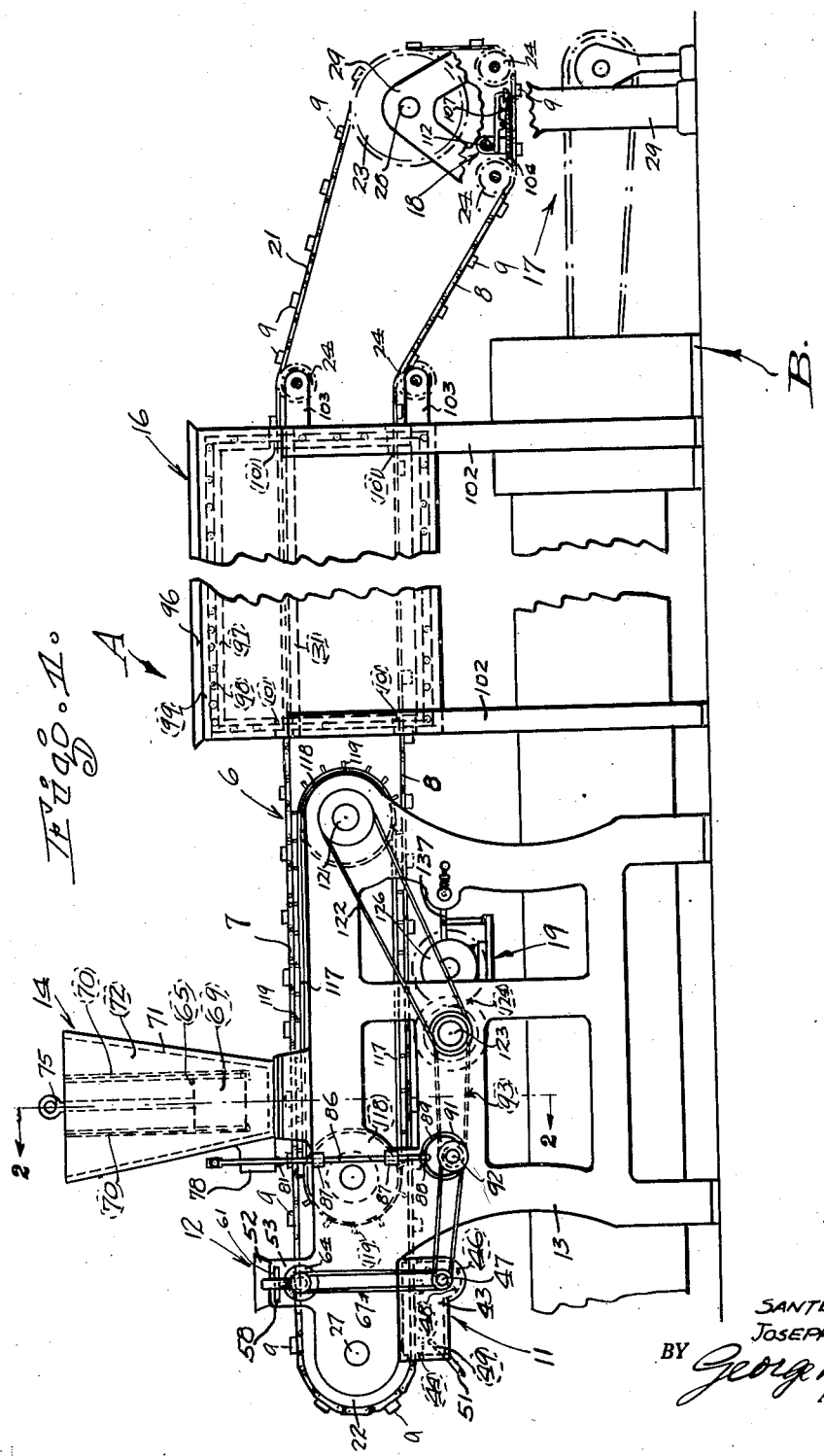

March 3, 1936. S. QUATTRIN ET AL 2,032,812
APPARATUS FOR MAKING CONFECTIONS
Filed March 12, 1932 4 Sheets-Sheet 4
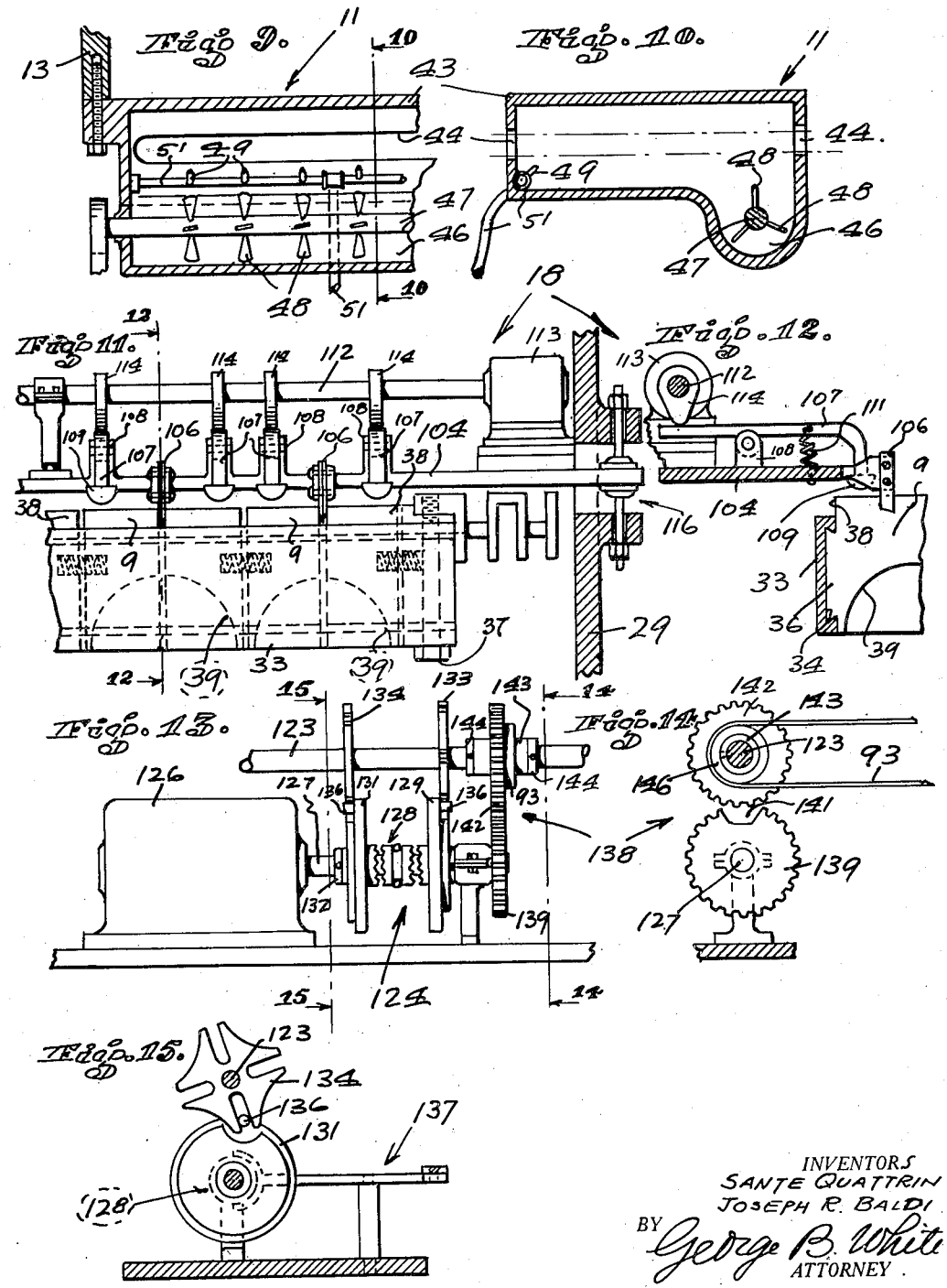
INVENTORS
SANTE QUATTRIN
JOSEPH R. BALDI
BY George B. White
ATTORNEY Patented Mar. 3, 1936

2,032,812

UNITED STATES PATENT OFFICE 2,032,812

APPARATUS FOR MAKING CONFECTIONS

Sante Quattrin and Joseph R. Baldi, San Francisco, Calif.

Application March 12, 1932, Serial No. 598,430

9 Claims. (Cl. 107—8)

The invention relates to an apparatus for making confections, and particularly to candy molding machines.

The primary object of the invention is to provide a method for molding candy, whereby the use of starched molds, and the delay due to long cooling processes, and other disadvantages attendant to present day methods of molding and cooling plastic candy, are entirely obviated.

In our improved method and apparatus the plastic candy is positively molded in individual molds, then cooled by a part of the apparatus, and then directly ejected onto a coating machine if desired; all the above mentioned operations being performed automatically and in synchronism; thus the use of starched trays, and of separate storage places for cooling, and the manual handling of trays and molds are eliminated.

Other objects and advantages are to provide a method of and apparatus for molding confections that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings, wherein

Fig. 1 is a side view of the machine constructed in accordance with our invention, the coating machine and the discharge end of the conveyor and sprockets being shown in outline, both machines being shown broken away in the center to indicate any desired length.

Fig. 2 is a sectional view of the depositor taken on the line 2—2 of Fig. 1, the central portion being broken away to indicate any desired length.

Fig. 3 is a fragmental perspective view of the assembly of the molds on the supporting bars.

Fig. 4 is a cross sectional view of the gate between the adjacent compartments of the depositor, the section being taken on the line 4—4 of Fig. 2.

Fig. 5 is a fragmental perspective view of the depositor, the conveyor and the molds being shown somewhat diagrammatically.

Fig. 6 is a detail view of the eccentric actuating mechanism for the depositor.

Fig. 7 is a fragmental sectional view of the filler depositor.

Fig. 8 is a sectional view of the filler depositor, the section being taken on the line 8—8 of Fig. 7.

Fig. 9 is a fragmental sectional view of the sprayer device.

Fig. 10 is a cross sectional view of the sprayer device, the section being taken on the line 10—10 of Fig. 9.

Fig. 11 is a fragmental view of the ejector device.

Fig. 12 is a cross sectional view of the ejector device, the section being taken on the line 12—12 of Fig. 11.

Fig. 13 is a detail view of the intermittent driving mechanism.

Fig. 14 is a sectional view of the intermittent connection between the driving mechanism and the depositor, the section being taken on line 14—14 of Fig. 13; and Fig. 15 is a sectional view of the driving mechanism indicating one of the intermittent drives, the section being taken on the line 15—15 of Fig. 13.

In its general organization our improved method of candy making includes the carrying of individual molds past a sprayer or other coating device wherein a coat of liquid, such as suitable oil, is applied to the molds, which liquid is capable of preventing the adhesion of plastic candy to the molds. Then the molds are carried in a continuous operation to a depositor to receive separate masses of plastic candy; the filled molds are carried through a cooler, and are lastly brought to an ejector mechanism, which latter ejects the cooled masses of candy from the molds, preferably onto the conveying mechanism of a chocolate coating machine.

In carrying out our invention we make use of an apparatus which includes a molding machine A, and a coating machine B. While in this illustrative embodiment of our invention the machine A is employed to cast or mold cores or fillings for confections coated with chocolate or the like, it is to be understood that the molding machine A may be used for molding any kind of confection which is cast in individual molds.

The molding machine A comprises an endless conveyor 6, which has an upper lap 7 and a lower lap 8. The conveyor 6 carries a plurality of transverse rows of molds 9. The molds 9 are carried in upright position throughout the upper lap 7 of the conveyor 6 and are held in substantially inverted position throughout the lower lap 8. The portion of the conveyor 6 where the molds are brought from inverted position into upright position is hereinafter referred to as the intake end of the conveyor 6. The portion of the conveyor where the molds 9 are turned from upright to inverted position, is herein referred to as the discharge end of the conveyor 6.

On the lower lap 8 and adjacent the intake end of the conveyor 6 is a sprayer or coating device 11, to apply a coat of suitable anti-adhesion liquid to the molds 9.

Above the intake end of the upper lap 7 is a filler device 12 which in some cases drops comparatively solid cores or filling, such as cherry, or nut, into the molds 9. Near to the device 12, and mounted on the frame 13 is a depositor mechanism 14 to drop, predetermined quantities of plastic candy, in separate masses, into the respective molds 9. Between the depositor mechanism 14 and the discharge end of the conveyor 6 is a cooling tunnel 16, of any desirable length and temperature, through which the conveyor 6 travels.

The discharge end of the conveyor 6 is guided downwardly closer to the intake end 17 of the coating machine B, to discharge the cooled and molded candy onto the machine B. It is to be noted that in this illustration the machine B is directly beneath the molding machine A.

Above the lower lap 8 of the discharge end of the conveyor 6 is an ejector device 18 to cause the loosening and dropping of the molded candy from the inverted molds, preferably immediately when the molds 9 are brought into inverted position.

The machine is provided with a driving mechanism 19 only at the portion of the conveyor 6 adjacent its intake end. The driving mechanism 19 is adapted to impart intermittent movement to both laps of the conveyor 6, and also to operate the depositor 14 in synchronism with the conveyor movement.

The various mechanisms of the molding machine A are so coordinated, that the molds 9 are automatically coated when passed through the sprayer device 11, and separate masses of plastic candy are fed into each row of molds 9 as the same is held below the depositor 14 at each stop of the intermittently moving conveyor 6. The rows of molds 9 are so spaced from each other, relatively to the conveyor movement, that at each stopping of the conveyor 6, a row of molds 9 is in registry with the depositor 9.

The length and the temperature of the cooling tunnel 16, as well as the speed of the conveyor movement, are so determined as to suitably cool the molded candy by the time it reaches the ejector device 18.

The conveyor 7 consists of two pairs of endless chains 21, trained around sprockets 22 at the intake end, and around sprockets 23 and idlers 24 at the discharge end of the conveyor. The pairs of chains 21 are spaced from each other to define the width of the conveyor 6. The chains 21 of each pair are also in parallel spaced relation with each other and are connected to each other by short transverse abutments 26, for engagement by the driving mechanism 19. The sprockets 22 are journaled on a shaft 27 in the frame 13. The sprockets 23 are mounted on a shaft 28 in a standard 29 at the discharge end. Suitable guides 31 along the paths of the chains 21 guide the conveyor.

On the inner chain 21 of each pair of chains are provided spaced flanges 32. The spaced respective flanges of the opposite sides of the conveyor 6 are in registry with each other. A pair of parallel bars 33 connect each set of opposed flanges 32. The bars 33 have longitudinal dovetail grooves 34 on their adjacent faces. Each mold 9 is provided with dovetail projections 36 on the opposite sides thereof to engage the grooves 34 thereby to hold the molds 9 and the bars 33 together. The bars 33 may be secured to the respective flanges 32 in any suitable manner. For instance in the construction herein shown, end pieces 34 fit into the ends of the dovetail grooves 34 and are detachably fastened by screws 37 to the flanges 32, thereby to hold the bars 33 and the row of molds 9 thereon in position, and also to fixedly space the chains 21 and complement the conveyor 6.

When assembling, the molds 9 can be inserted endwise between the bars 33, end to end, to form the desired row of molds, then the end pieces 34 are inserted in place and the whole unit is fastended to the flanges 32, in the manner heretofore stated.

Each mold 9 has a solid bottom 38 and a top with a mold cavity 39 therein. The mold cavity 39 is of any desired shape, and is finished by polishing or otherwise, to properly shape a plastic material therein. While each mold 9 may be made a solid unit, in the present instance, split molds are provided to facilitate ejection of the molded candy. Each mold 9 is split at right angles to the bars 33, so that the split halves of the molds 9 may be pried apart longitudinally of the bars 33. In the ends of the molds 9 are aligned recesses 41, into which latter fit coil springs 42 to normally urge the split halves of the molds 9 together. The springs 42 also hold the adjacent molds 9 slightly spaced from each other to provide clearance for the opening of said molds 9. The bottoms 38 of the molds 9 protrude beyond the adjacent edges of the bars 33, for engagement by the ejector device 18.

The spacing of the rows of molds 9 is determined by the spacing of the flanges 32 from each other on the same side of the conveyor 6. If it is desired to increase the spacing between subsequent rows of molds 9, then some flanges 32 can be left free. Of course, in the latter case the actuators for the depositor 14 and for the mechanism 12 should be correspondingly adjusted.

The sprayer device 11 includes an inclosed housing 43 mounted on the frame 13. The housing 43 is completely inclosed except for transverse slots 44 in its opposite ends through which the lower lap 8 of the conveyor 6 passes. In the bottom of the housing 43 is formed a transverse reservoir 46. A shaft 47 is journaled in the sides of the housing 43 and above the reservoir 46. Blades or brushes 48 extend radially from the shaft 47 to splash the liquid from the reservoir 46 onto the molds 9 as the latter are moved through the housing 43 in inverted position. Near the end of the housing 43, where the molds 9 leave said housing, are a plurality of nozzles 49 connected to a conduit 51, which latter conducts compressed air or the like. The nozzles 49 direct the flow of air under pressure against the molds 9 after the latter are splashed with liquid, thereby blowing off any surplus liquid, and distributing the liquid coating on the molds 9 into a substantially uniform film.

The filler depositor 12 comprises a trough 52 supported at its ends on brackets 53, the latter being extended upwardly from the frame 13. The bottom 54 of the trough 52 has a series of holes 56 therethrough. The holes 56 are so spaced as to register with the cavities 39 of the series of molds 9 therebelow. Longitudinal guides 57 are provided along the outer edges of the bottom 54, on which guides 57 is slidable a plate 58. The plate 58 has a series of holes 59 therethrough so spaced as to register with the holes 56. When the holes 56 and 59 are in registry with each other, the filler, such as cherry, is allowed to drop therethrough into the corresponding series of molds 9 therebelow.

During the period when the conveyor is moved, the plate 58 is moved along the guides 57 so that the holes 59 do not register with the holes 56 whereby the passage from the holes 56 is obstructed. When a series of molds 9 is brought in registry with the holes 56 then the plate 58 is slid to a position where the holes 59 register with the holes 56 and the fillers are allowed to drop therethrough. The plate 58 may be actuated by any suitably timed mechanism. In this illustration an end of the plate 58 is slidably extended through an aperture 61 in the bracket 53. On this extension is a vertically journaled roller 63. Between the roller 63 and the bracket 53 is a cam 64 mounted on a shaft 66, which latter is journaled in the bracket 53. The shaft 66 is connected by a transmission 67, to the shaft of the sprayer 11, or if so desired it may be connected directly to the driving mechanism 19. The cam face of the cam 64 is adapted to push the roller 63 away from the bracket 53 at a certain portion of its movement; at other times the roller 63 is allowed to move back toward the bracket 53. A spring 68 connected to the extension of the plate 58 and to the end of the stationary trough 52, normally urges the roller 63 toward said bracket 53 so as to move the plate 58 to registering position relatively to the bottom 54. The cam 56 and the transmission 67 are so arranged and timed as to reciprocate the plate 58 in synchronism with the intermittent movement of the conveyor 6.

The depositor device 14 comprises a container or hopper 71, mounted on the frame 13 above the conveyor 6. The container 71 extends transversely across the entire width of the conveyor 6. There are partitions 72 across the conveyor 6 to divide it into a plurality of separate compartments 73. The partitions 72 are preferably integral with the walls of the container 71. The container 71 is open at its top and closed at its bottom. There may be as many compartments 73 in the container 71 as desired. The compartments 73 contain different kinds of plastic candy so that in the same row of molds 9 may be simultaneously molded as many kinds of separate fillings or candy as the number of compartments 73. Thus the same machine may be used to mold different kinds of candies in the same operation.

The walls of the container 71 have heating jackets 74 formed therein. Each partition 72 has also a heating jacket 76 therein. The heating jackets 74 and 76 are preferably connected to each other, and contain a suitable heating element, or steam conduits. In this manner each separate compartment 73 is surrounded by properly heated walls.

In order to allow the use of the same container 71 with lesser number of separate compartments, or even as a single compartment, a comparatively large aperture 65 is provided through each partition 72. These apertures 65 are usually securely covered by gates 69 held on the abutment ends of vertical guides 70. A handle 75 extends from each gate 69 upwardly above the top of the container 71 to facilitate the manual removal of any or all the gates 69 thereby to allow the plastic candy to flow through the respective apertures 65 from one compartment 63 to the next. In this manner the depositor is readily adjustable for casting only one kind of candy, or different kinds of candy in definite numbers.

Adjacent the bottom of the container 71 there is a longitudinal opening 77 through a side wall of said container. The opening 77 extends from one end to the other end of the container 71, so that each and every compartment 73 is opened at one side adjacent its bottom. Over the opening 77 fits a solid pump casing 78, which is fixedly secured to the side of the container 71 and completely covers the opening 77. The pump casing 78 forms a cylinder block, with a plurality of separate vertical cylinders 79. There are, at least, two such cylinders 79 opposite each compartment 73. The lower ends of the cylinders 79 terminate in nozzles 81. The nozzles 81 are arranged to correspond to and register with the individual molds 9 of each row of molds on the conveyor 6. If there are fourteen individual molds 9 in each row, then there are also fourteen individual nozzles 81 arranged transversely above the conveyor 6 to register with the respective molds 8. Furthermore if the container 71 is divided into seven compartments, with two nozzles 81 connected to each compartment, then the machine A can cast seven kinds of candies in the same operation, two of each kind in each row of molds 9.

An inlet 82 connects each cylinder 79 to the adjacent compartment 73. A plunger 83 works in each cylinder 79. All the plungers 83 are connected to an operating bar 84 above the casing 78. The opposite ends of the bar 84 are adjustably secured to vertical rods 86, which latter extend through guides 87 on the opposite sides of the frame 13. The lower end of each rod 86 terminates in a bifurcated element 88 which slidably engages the cam groove 89 of an eccentric 91. The opposite eccentrics 91 are mounted on a shaft 92 journaled in the frame 13, and connected by a suitable transmission 93 to the driving mechanism 19, whereby the shaft 92 is rotated in synchronism with the conveyor movement. Every time a row of molds 9 stops below the nozzles 81 the eccentrics 91 are actuated to raise and lower the rods 86 thereby moving the bar 84, and all the plungers 83, upwardly and downwardly, for an intake and discharge stroke, to discharge a separate, predetermined mass of plastic candy into each of the molds 9. The plungers 83 remain in the discharge position until the next intermittent move of the conveyor 6 is completed.

The cooling tunnel 16 may be of any suitable length and of any suitable construction. The tunnel 16 herein shown comprises outer and inner casings 96 and 97 with cooling coils 98, and a heat insulator 99 between the casings 96 and 97. The coils 98 are connected to the usual refrigerating mechanism not shown. In each end of the tunnel 16 are two parallel transverse openings 101 through which the respective laps of the conveyor 6 enter and leave the tunnel 16. There are conveyor guides 31 of the usual type along the sides of the tunnel 16. Legs or standards 102 support the tunnel 16 at the desired level above the floor.

The guide sprockets or idlers 24 adjacent the end of the tunnel 16 are mounted on brackets 103 extended from the sides of the tunnel, to guide the respective inclined laps of the conveyor 6 from and to the level positions as shown. The guide sprockets or idlers 24 below the sprockets 23 are journaled on the standard 29 so that a portion of the lower lap of the conveyor 6 is guided on a short level path, immediately after the molds 9 are brought into inverted position. The ejector mechanism 18 is disposed above this last mentioned level path, and between these last mentioned idlers 24.

The ejector mechanism 18 comprises a platform 104 extending transversely of the conveyor 6 and above the lower lap of the latter. The platform 104 is mounted on the standards 29. On the platform 104 are mounted a plurality of blades 106, which are arranged to register with the splits of the row of molds 9. The blades 106 are of such length that they do not penetrate into the cavities 39 of the inverted molds, but merely enter between the split halves of the molds at the solid bottom 38 sufficiently far to force them apart. The blades 106 are comparatively thin so that the molds 9 are pried apart only very slightly, merely to loosen the cooled candy, without touching it.

On each side of each blade 106 is a hammer 107, pivoted intermediate its ends on lugs 108, on the platform 104. An end of each hammer 107 is aligned with the bottom of one half of a mold 9, and is padded at its tip 109. A spring 111, secured at one end to the hammer 107 and at its other end to the platform 104 urges the hammer 107 toward the bottom of the mold 9 so that the tip 109 strikes the mold bottom lightly thereby to cause the dropping of the molded candy from the mold 9. A transverse shaft 112 extends above the platform 104 from end to end, and above the other end of each hammer 107. The shaft 112 is rotated by an electric motor 113 or the like. On the shaft 112 are fixed a plurality of cams 114, one above the end of each hammer 104 farthest from said tip 109, so that the cams 114 act against the action of the respective springs 111 and momentarily raise the tips 109 away from the bottoms of the respective molds 9. Thus a vibration is created to loosen and drop the candy from the molds, without the ejector touching the candy at all. The mounting 116 of the platform 104 is adjustable to various heights above the lower lap of the conveyor, to prevent the entangling of the vibrators with the molds.

The ejector mechanism is directly above the intake end of the conveyor 17 of the coating machine B, so that the molded filling can be carried through the coating machine B, and coated in the same continuous operation, and without being touched by human hands.

The driving mechanism 19 comprises an endless chain 117 on each side of the conveyor 6, between the laps of the chains 21. The chains 117 are considerably shorter than the length of the chains 21. In fact the chains 117 are short enough to be trained around sprockets 118 journaled in the frame 13, between the intake end of the conveyor 6 and the adjacent end of the tunnel 16. Each chain 117 is so disposed that its upper lap is immediately below and between the upper laps of the adjacent pair of chains 21, and its lower lap is immediately above and between the lower laps of the chains 21.

Each chain 117 has teeth 119 extended therefrom for engagement with the connecting members 26 between the chains 21. The teeth 119 are spaced equally to the spacing between the connecting members 26. Thus the chains 117 exert a simultaneous pull on both the upper and lower laps of the conveyors 6, but in opposite directions.

The shaft 121 of the sprocket 118 adjacent the tunnel 16 is driven preferably through transmission 122 from a drive shaft 123, journaled in the frame 13 intermediate the ends of the latter. The transmission 122 may be a belt transmission, as shown, or it may be silent chain driven, or any other suitable transmission.

The shaft 123 is driven by an intermittent drive mechanism 124. For the purpose of illustration we show an electric motor 126, on the feathered shaft 127 of which is a slidably double jaw clutch 128. Opposite the faces of the clutch are drive discs 129 and 131, of the usual "Geneva" gear drive type. The discs 129 and 131 idle on the shafts 127. Fixed collars 132 at the outside faces of the discs 129 and 131 hold same against movement away from the clutch 128. The usual intermittent driven gears 133 and 134 are fixed on the shaft 123 and are engaged by roll pins 136 on the discs 129 and 131 respectively.

It is to be noted that the driven gear 133 has eight radial notches to form radial cogs to be engaged by the roll pin 136, which latter extends from the face of the disc 129. The face of the disc 129 overlaps the gear 133, so that the driven gear 133 will revolve substantially one eighth turn every time the pin 136 engages a cog of the gear 133. The connections between the shaft 123 and the shaft 121, and the diameter of the sprockets 118 are so designed that the said one eighth turn of the gear 133 advances the conveyor 6 to a distance equal to the spacing between two adjacent rows of molds 9. The other gear 134 has only four cogs, otherwise the driving is similar to that heretofore described, except that the resulting movement will be as one fourth turn of the gear 134, and the conveyor 6 will be advanced twice as far as the distance advanced by the movement of the gear 133.

Each disc 129 and 131 has a jaw clutch face, opposite the clutch 128, to be selectively engaged by the latter. The clutch 128 is shifted by a lever mechanism 137, or by any conventional control. The electric motor 126 is connected to a source of electricity by the usual switch, not shown. In the aforedescribed manner, selective intermittent drive is provided for the conveyor 6.

The transmission 93 between the shaft 123 and the eccentric 91 is also variable to change the ratio of movement as the intermittent drive is changed. This may be accomplished by the usual shifting of the belt to pulleys of different ratios. The same drive structure is utilized between the shaft 92 and the shaft 47 of the sprayer device 11. The transmissions and driving mechanisms may be changed within the scope of this invention, but ultimately the connections in all structures must be so designed that the filler 12, and the depositor 14 are operated in synchronism with the intermittent advance of the conveyor 6, consequently after the initial adjustments the rows of molds 9 are carried intermittently, but in one continuous operation, to the sprayer 11, the filler 12, the depositor 14, then through the tunnel 16 to the ejector 18, to complete the molding of the candy accurately, automatically and speedily.

In order to properly time the operation of the depositor device 14 to the moment when the conveyor 6 is at rest, a separate intermittent drive connection is provided therefor. Such an intermittent drive connection 138 is illustrated in Fig. 14. On the motor shaft 127 is fixed a gear 139, a sector 141 of which is cut away. The gear 139 is in mesh with a gear 142 fixed on a sleeve 143, which latter is rotatably held on the shaft 123, and is prevented from sliding on the shaft 123 by fixed collars 144. A pulley or sprocket 146, as the case may be, is fixed on the sleeve 143, and is suitably engaged by the transmission 93. The gear 139 is so fixed on the shaft 127 that the cut away portion 141 is opposite the gear 142 each time the operative roll pin 136 is engaged with the cogs of the respective gears 133 or 134. Hence while the gear 139 drives substantially a full revolution, while the roll pins 136 travel around to engage subsequent cogs of the gears 133 and 134, but at the moment the pin 136 actually engages a cog and moves the conveyor 6, the cut away gear portion 141 is opposite the gear 142 and the depositor 14 is not actuated until the conveyor 6 is again brought to rest.

Having thus described this invention, what we claim and desire to secure by Letters Patent is:

1. In a machine of the character described, a conveyor, parallel sets of transverse bars secured to the conveyor, individual molds arranged in a row on each set of bars; each set of bars being adapted to slidably receive a row of individual molds endwise, and to hold the molds in place, each mold being split in the direction of its travel on the conveyor; and means to resiliently urge the split halves of the individual molds together.

2. In a machine of the character described, the combination with an endless conveyor; transverse rows of individual molds held on the conveyor in upright position on the upper lap, and in inverted position on the lower lap of the conveyor, means to deposit separate masses of plastic material into the individual molds; cooling means for said molds, said conveyor being passed through said cooling means during a portion of its travel; of driving means for the conveyor entirely outside the cooling means, including endless chains parallel with and between the laps of the conveyor; and means on the endless chains to engage the respective conveyor laps and impart movement thereto.

3. In a machine of the character described, an endless conveyor; transverse rows of individual molds on the conveyor being carried in upright position on the upper lap and in inverted position on the lower lap of the conveyor; each mold being longitudinally split, means to resiliently urge the split halves of the molds together, means to eject the contents of the molds, comprising a row of blades opposite the bottoms of the molds on the lower lap of the conveyor, the blades being in alignment with the splits of the rows of molds to pry the split portions of the molds apart as the latter are carried past the blades by the conveyor; and means to impart vibration to the same row of molds as the latter is carried past the blades.

4. Molds for a machine of the character described comprising a pair of parallel bars, adapted to be secured on a carrying mechanism, and a plurality of individual mold elements held between the bars, means of connection between the mold elements and the bars whereby the said elements are held on the bars but being slidable lengthwise between the bars, each mold element being split at an angle to the bars, and resilient means to urge the portions of each mold element together.

5. Molds for a machine of the character described comprising a pair of parallel bars, adapted to be secured on a carrying mechanism, and a plurality of individual mold elements held between the bars, means of connection between the mold elements and the bars whereby the said elements are held on the bars but being slidable lengthwise between the bars, each mold element being split at an angle to the bars, resilient means to urge the portions of each mold element together, and means at the ends of the bars to prevent endwise removal of the mold elements, said resilient means being adapted to also space the adjacent mold elements apart from each other.

6. In a machine of the character described, the combination with an endless conveyor, means for feeding plastic material in separate masses onto the conveyor, and means to move the conveyor and operate the feeding means in synchronism, of transverse rows of detachably united individual split molds on the conveyor to receive said separate masses of plastic material.

7. A row of molds for a machine of the character described, comprising a plurality of individual molds arranged side by side, means adapted to be secured on a carrying mechanism to detachably unite the individual molds into a row; and means to resiliently space the adjacent molds from each other.

8. In a candy molding machine wherein a conveyor carries a plurality of rows of molds, means for spraying the molds comprising an inclosed housing having an inlet and an outlet through which the conveyor and the molds pass; a reservoir formed in the housing, a splasher in the housing to splash fluid from the reservoir onto the molds in the housing, and means in the housing to blow off surplus fluid from the molds before the latter leave the housing.

9. In a depositor for a machine of the character described, the combination with a container to hold plastic material having a plurality of separate dispensing devices thereon to discharge separate masses of plastic material from said container; of partitions to divide the interior of the container into a plurality of separate compartments in operative relation to the respective dispensing devices, means to heat the walls of said container, and means related to said first heating means to heat each of said partitions; and adjustable means whereby a selected number of compartments may be communicated with each other at will.

SANTE QUATTRIN.
JOSEPH R. BALDI.